United States Patent [19]

Kuno et al.

[11] 4,367,453
[45] Jan. 4, 1983

[54] AUTOMOTIVE DRIVING DIRECTION AND POSITION INDICATOR APPARATUS

[75] Inventors: Akira Kuno, Oobu; Muneaki Matsumoto, Okazaki; Koji Numata, Toyokawa; Susumu Urano, Oobu, all of Japan

[73] Assignees: Nippondenso Co., Ltd., Kariya; Nippon Soken, Inc., Nishio, both of Japan

[21] Appl. No.: 252,804

[22] Filed: Apr. 10, 1981

[30] Foreign Application Priority Data

Apr. 14, 1980 [JP] Japan .................................. 55-49390

[51] Int. Cl.³ ........................ G06F 15/50; G09B 29/10
[52] U.S. Cl. ...................................... 340/23; 364/424; 364/436
[58] Field of Search ..................... 364/424, 436, 444; 340/23, 24; 33/318

[56] References Cited

U.S. PATENT DOCUMENTS 3,925,641 12/1975 Kashio .................................. 340/23
4,139,889 2/1979 Ingels .................................. 364/424

Primary Examiner—Thomas A. Robinson

Attorney, Agent, or Firm—Cushman, Darby & Cushman

[57] ABSTRACT

An apparatus for displaying the driving direction and distance coverage of a motor vehicle, wherein a unit distance coverage signal is generated each time the motor vehicle covers a unit distance, a direction signal indicating the present driving direction of the motor vehicle is generated, and the distance and the direction from a starting point to a destination point can be set and the resulting setting signals are generated. The distance coverage for each driving direction of the motor vehicle is accumulated on the basis of the unit distance coverage signals and the direction signals, and from the accumulated values the vector from the starting point to the present position is calculated. The calculated vector and the vector from the starting point to the destination point which is obtained from the setting signals are used to calculate the vector from the present position to the destination. The present driving direction of the motor vehicle is indicated on a first display section in response to the direction signal, and the direction and the distance of the vector from the present position to the destination are displayed on a second display section on the same display panel on which the first display section is provided.

9 Claims, 8 Drawing Figures

AUTOMOTIVE DRIVING DIRECTION AND POSITION INDICATOR APPARATUS

RELATED REFERENCE

U.S. Ser. No. 231,441 filed Feb. 4, 1981 which was assigned to the same assignee is copending with this application.

BACKGROUND OF THE INVENTION

The present invention relates to apparatus for and a method of informing the driver of a motor vehicle of the present position and the direction at travel thereof at the same time.

Conventionally, the driving position of a motor vehicle is determined by correlation of a road sign with a road map. In a place where a road sign is lacking, however, it is impossible to confirm whether the present driving direction or position of a motor vehicle is correct or not and to which direction the vehicle should be driven.

SUMMARY OF THE INVENTION

According to the present invention, both a direction signal in accordance with the direction in which the motor vehicle is being driven and a position signal representing data on the straight distance and direction from the present position to a destination point set at a starting point or from a starting point are generated. The driving direction of the motor vehicle is displayed on the basis of the direction signal. Data is also displayed on the direction and the straight distance to the destination point or from the starting point on the basis of the position signal. Furthermore, all data is displayed on the same display panel so that at a given driving position, the direction in which the motor vehicle is being driven with respect to the destination point or the starting point can be identified.

Also, according to the present invention, since the present direction and the straight distance either from the present position to the destination point or from the starting point of the motor vehicle to the present position are displayed, the relative position of the motor vehicle with respect to the destination point or the starting point can be clarified. Further, in view of the fact that the driving position and the driving direction are displayed on the same display panel, the present driving direction with respect to the destination point or the starting point can be easily identified by mutual comparison of the two displays at a given driving point.

DESCRIPTION OF PREFERRED EMBODIMENTS

Figure 1:
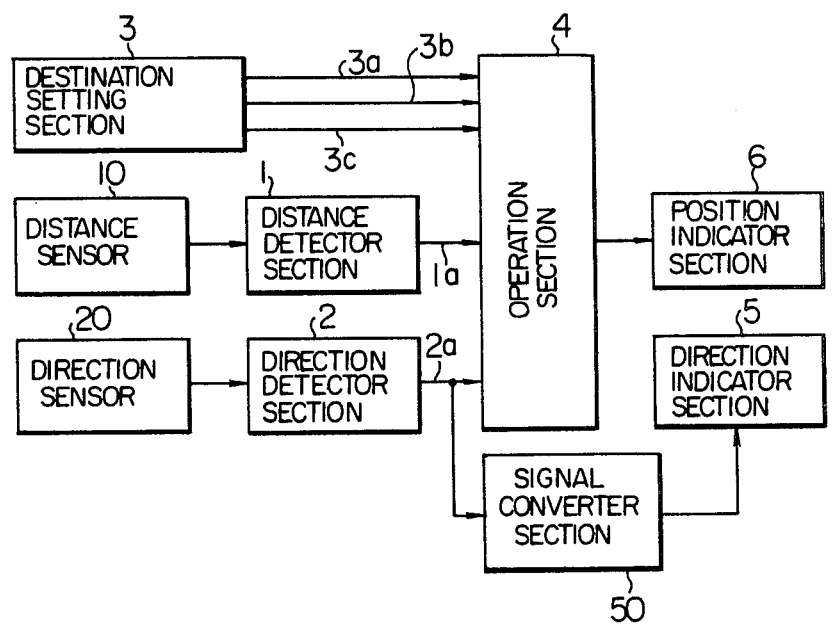
FIG. 1 is a block diagram schematically showing a general configuration of an embodiment of the present invention.
Figure 2:
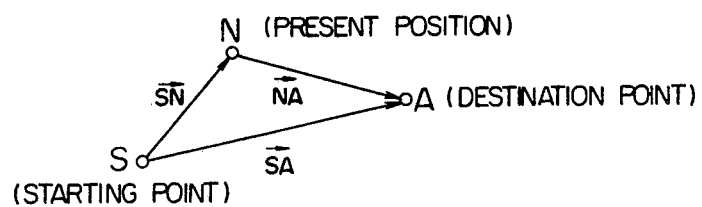
FIG. 2 is a vector diagram for explaining the calculations made according to an embodiment of the present invention.

Embodiments of the present invention will be described below with reference to the accompanying drawings. A general configuration of an embodiment of the present invention is schematically shown in FIG. 1. In FIG. 1, reference numeral 1 designates a distance detector section which receives a signal from a distance sensor 10 which generates a pulse at regular intervals of distance coverage, and produces a unit driving distance signal at a terminal 1a thereof. Numeral 2 designates a direction detector section, which receives a signal representative of the driving direction of a motor vehicle from the direction sensor 20, detects and identifies the driving direction and produces a direction signal at a terminal 2a thereof. Numeral 3 designates a destination setting section for producing a destination distance signal at a terminal 3a and a destination direction signal at a terminal 3b thereof with respect to the distance and direction to the destination point set at the starting point. Numeral 4 designates an operation section which is supplied with the unit driving distance signal, the direction signal, the destination distance signal and the destination direction signal, constantly calculates the vector $\vec{SN}$ of the present position N covered from the starting point S as shown in the vectorial diagram of FIG. 2, calculates the value of $\vec{SA} - \vec{SN}$ on the basis of the vector $\vec{SN}$ thus obtained and the values set as the destination distance signal and the destination direction signal at the destination setting section 3, namely, the vector $\vec{SA}$ of the destination point A from the starting point S in FIG. 2, calculates the vector $\vec{NA}$ of the destination point A from the present position N, and thus produces a position signal indicative of the straight distance and the direction making up a component of the vector $\vec{NA}$. Numeral 50 designates a signal converter section for converting the direction signal obtained from the direction detector section 2 and producing a direction indication signal for indicating the present driving direction. Numeral 5 designates a direction indicator section making up a first indicator section for selectively indicating by light emission one of the eight directions in response to the direction indication signal produced from the signal converter section 50. Numeral 6 designates a position indicator section making up a second indicator section for digitally indicating the straight distance and the direction with respect to the destination in response to the position signal obtained from the operation section 4. Signal generator means comprises distance detector section 1, the direction detector section 2, the destination setting section 3, the operation section 4, the distance sensor 10, the direction sensor 20 and the signal converter section 50.

Figure 3:
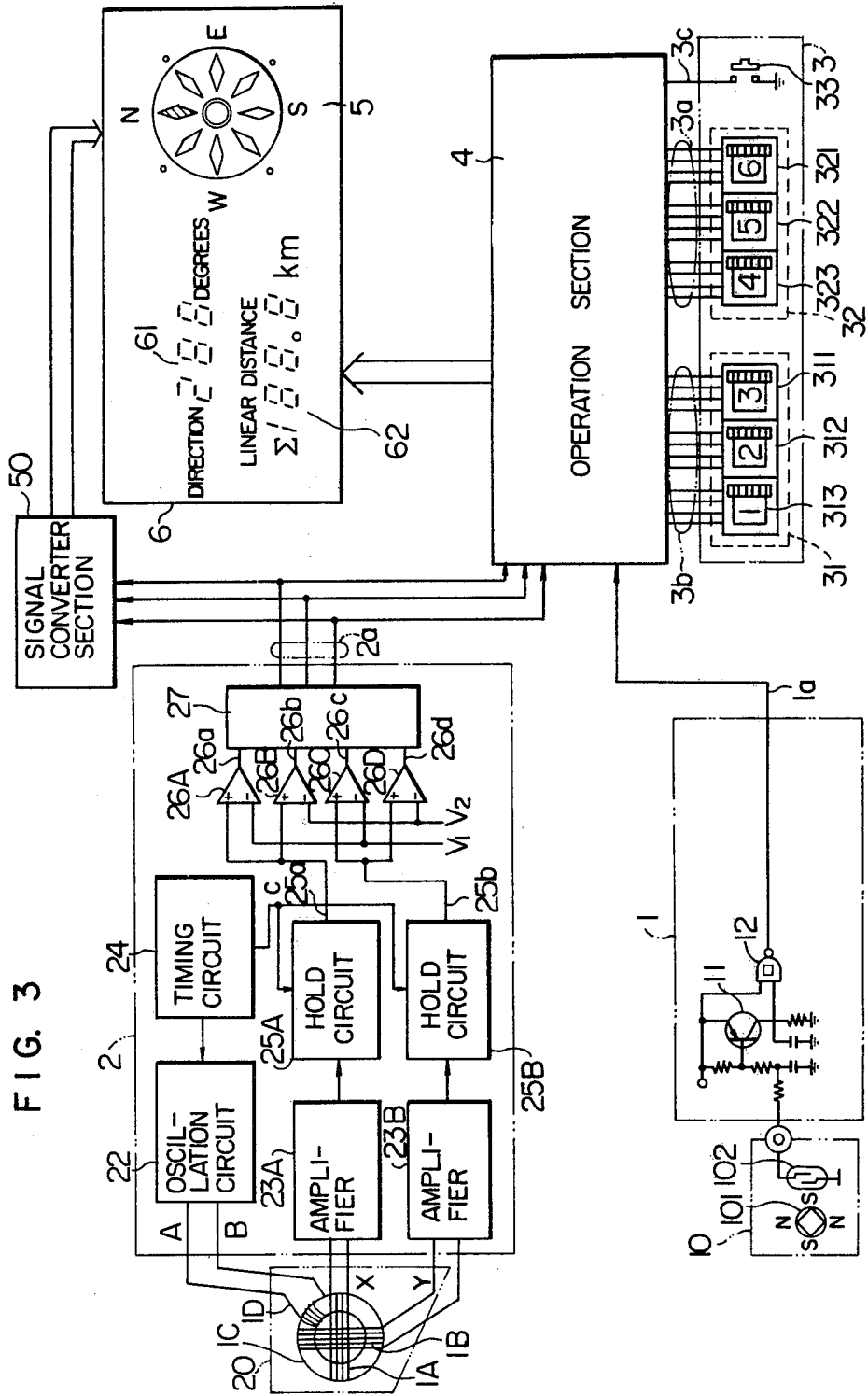
FIG. 3 is an electric circuit showing a detailed configuration of the embodiment of FIG. 1.

A detailed circuit embodying each of the above-described blocks will be described with reference to FIG. 3. In FIG. 3, the distance sensor 10 includes a rotary member 101 which consists of a magnet which is interlocked with a drive shaft or a wheel of the vehicle and which therefore moves in accordance with the rotation of the wheel, and a reed switch 102 operated in accordance with the north or south pole position of the rotary member 101. This distance sensor 10 generates a pulse at each coverage of 1/2550 km. The distance detector section 1 includes a transistor 11, resistors, capacitors and a waveform shaping gate 12, and produces a unit driving distance signal representing 1/2550 km for each pulse at the terminal 1a.

Figure 4:
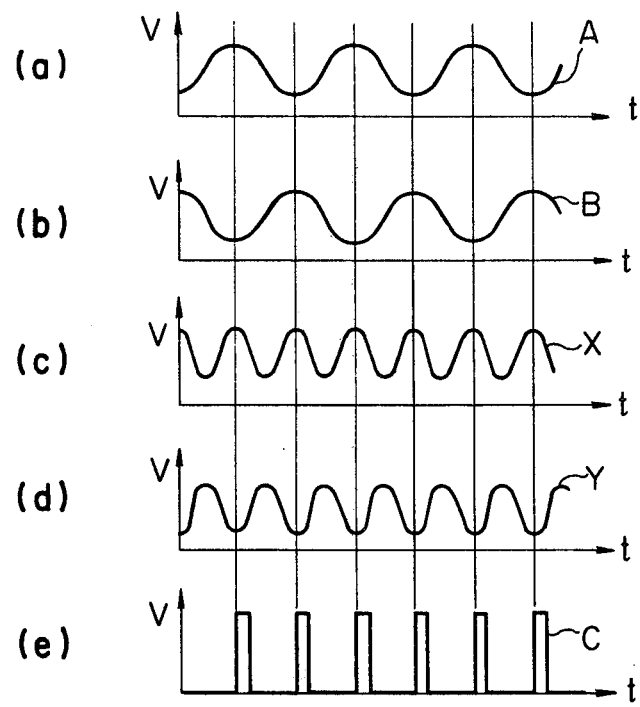
FIG. 4 is a diagram showing voltage waveforms for explaining the operation of the direction detector section.
Figure 5:
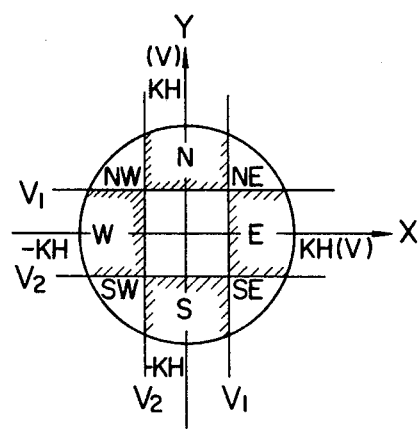
FIG. 5 is a diagram showing an operating principle for explaining the operation of the direction detector section.

The operation of the direction sensor 20 and the direction detector section 2 will be described with reference to FIGS. 4 and 5. In FIG. 3, the direction sensor 20 has a magnet core 1C of a ferromagnetic material wound with an exciting coil 1D, and output windings 1A and 1B at right angles to each other. Numeral 22 designate an oscillation circuit providing symmetric AC signals A and B (FIGS. 4a and 4b) for exciting coil 1D at a frequency f. The magnetic field in the magnetic core 1C changes in accordance with the intensity H of the horizontal component of the earth magnetism, and outputs X and Y (FIGS. 4c and 4d) proportional to such a change are produced at the output windings 1A and 1B respectively. The outputs X and Y at the output windings 1A and 1B change in accordance with the change of the driving direction of the motor vehicle, that is, the direction of the direction sensor 20. The output X and Y are amplified at amplifier circuits 23A and 23B respectively, therefore, in such a manner that the maximum values thereof are equal to each other, followed by the sample holding at holding circuits 25A and 25B in response to a signal C from the timing circuit 24 (FIG. 4e), with the result that the output voltages at the points 25a and 25b change in proportion to the outputs X and Y of the direction sensor 20 respectively. If the direction sensor 20 is turned by 360 degrees, the traces drawn by the outputs at the points 25a and 25b form a circle of a magnitude proportional to the intensity H of the horizontal component of the earth magnetism (radius KH (volt), K being a constant) as shown in FIG. 5. In the case of division into eight directions, one direction covers 45 degrees, and therefore predetermined reference voltages $V_1$ and $V_2$ are given as $$V_1 = K \sin 22.5° \approx 0.3827K \text{ (volts)}$$

$$V_2 = K \sin 22.5° \approx -0.3827K \text{ (volts)}$$

It is thus seen that each of the signals obtained by amplifying the output signals from the output windings 1A and 1B is divided into three signal levels. The reference voltages $V_1$ and $V_2$ are compared respectively with the output of the holding circuit 25A by the comparators 26A and 26B (MC3302P of Motorola) and with the output of the holding circuit 25B by the comparators 26C and 26D in FIG. 3. As a consequence, the relation between the driving direction of the motor vehicle and the outputs of the comparators at the points 26a, 26b, 26c and 26d is primarily given as shown below.

| X | Y 26c 26d | | | |
|---|---|---|---|---|
| 26a 26b | 0 0 | 0 1 | 1 0 | 1 1 |
| 0 0 | SW | W | | NW |
| 0 1 | S | | | N |
| 1 0 | | | | |
| 1 1 | SE | E | | NE |

For example, assuming that the points 26a and 26b are both at "1" level, the point 26c at "0" level and the point 26d "1" level, for instance, the direction of the automobile is recognized to be "E," namely, east. The outputs at points 26A, 26B, 26C and 26D are applied to a logic circuit 27 for logic operation, and the driving direction of the automobile is divided into eight directions, so that a direction signal in the form of binary code is produced at the output terminal 2a of the direction detector section 2.

The destination setting section 3 includes a direction setting section 31, a distance setting section 32 and a set switch 33. The direction setting section 31 and the distance setting section 32 are for producing, by manual operation, a destination direction signal in the form of an angle of the direction to the destination point from the starting point and a destination distance signal respectively in BCD code at the terminals 3b and 3a respectively. According to the present embodiment, the setting sections 31 and 32 include rotary digital switches 311, 312, 313; and 321, 322, 323 respectively thereby to produce a set value of three digits. The set switch 33 is operated at the time point of setting at the starting point for producing a set signal at the terminal 3C.

Figure 6A:
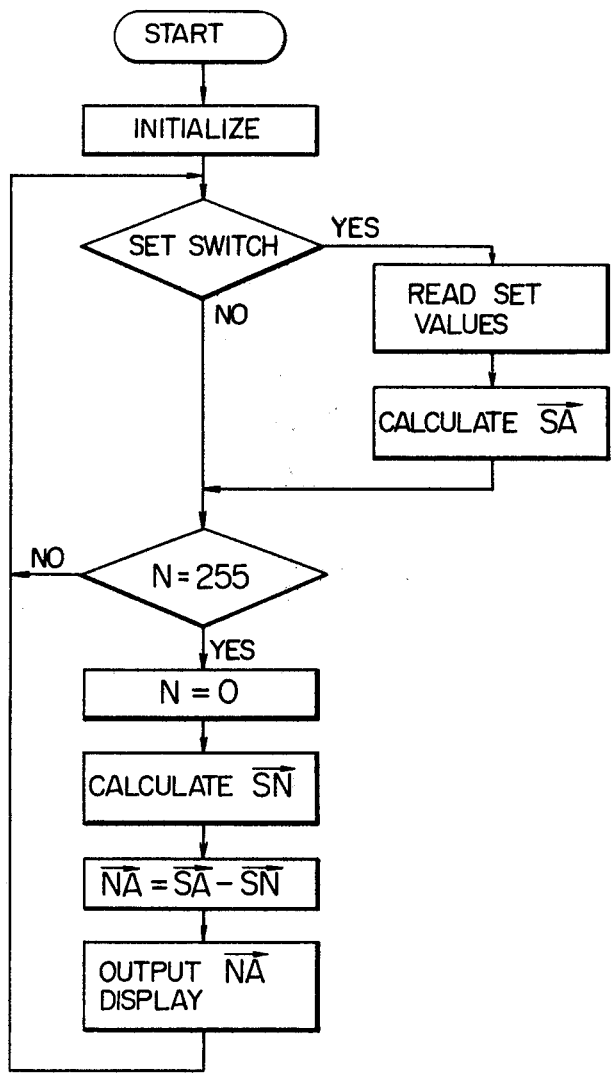
FIGS. 6a and 6b are operation flow charts showing the processes of operation at an operation section.
Figure 6B:
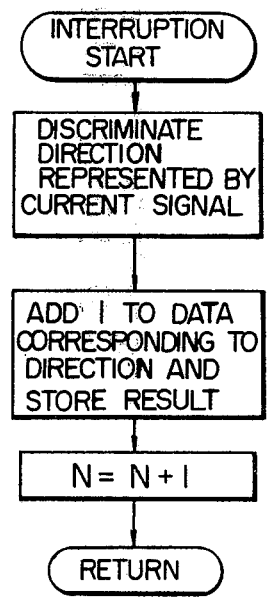

The operation section 4 includes a well-known microcomputer system and executes the operations shown in FIGS. 6a and 6b. First, in the main routine shown in FIG. 6a, the vector value $\vec{SA}$ (See FIG. 2) from the starting point S to the destination point A is calculated beforehand at the time point of generation of a set signal from the destination point setting section 3. Each time a unit driving distance signal is generated from the distance detector section 1, the interruption operation process shown in FIG. 6b is executed, and a value representing the unit driving distance is accumulatively stored in the storing position of a memory corresponding to the direction signal of the direction detector section 2 at that time. Then, transfer is made back to the main routine, so that each time the driving distance reaches 100 m, that is, each time the count or number-of-times data N reaches 255, the vector value $\vec{SN}$ (See FIG. 2) of the present position N from the starting point S is calculated from the accumulative value of the distance thus far calculated for each direction. From the vector values $\vec{SA}$ and $\vec{SN}$, the value $\vec{NA}$ from the present position N to the destination point A is calculated. ($\vec{NA} = \vec{SA} - \vec{SN}$). The vector $\vec{NA}$ is divided into the direction and the distance and is applied as indication signals to the angle indicator section 61 and the distance indicator section 62 respectively of the position indicator section 6. In this way, digital values of the direction and the straight distance to the destination point are displayed on the angle indicator section 61 and the distance indicator section 62 respectively.

The direction signal from the direction detector section 2 is converted at the signal converter section 50, thereby causing selective light-emission display of the display element of the direction indicator section 5 located beside the position indicator section 6. The direction indicator section 5 is arranged radially from the center thereof as shown in FIG. 3 and comprises eight arrow indicator sections, one of which is caused to display by light emission the driving direction of the motor vehicle. The direction indicator section 5 and the position indicator section 6 are integrally made of a phosphorescent display tube.

In the embodiment described above, the direction detector section 2 involves eight directions. As an alternative, it is apparent that the more the number of divisions of the direction, the higher the accuracy of the result of the calculation made at the calculation section 4 and the result is displayed at the angle indicator section 61 and the distance indicator section 62. Thus the number of directions may be 16, 32, 360 or the like instead of 8. Also, the display on the direction indicator section 5 may accordingly be divided into 16, 32, 360 or the like parts.

Further, the destination setting section 3 may be replaced by the set switch 33 alone, so that the direction and the linear distance represented by the vector value $\vec{SN}$ from the starting point S to the present position N are calculated and indicated on the position indicator section 6, thus eliminating the troublesome operation of setting the destination point.

Furthermore, although the value in the direction setting section 31 of the destination point setting section 3 is set in angle in the aforementioned embodiments, it may be constructed such that a symbol such as "north-west" or "south-south-west" is set and a code made by encoding the set symbol is applied to the operation section 4, in order to make the destination setting facility general.

Figure 7:
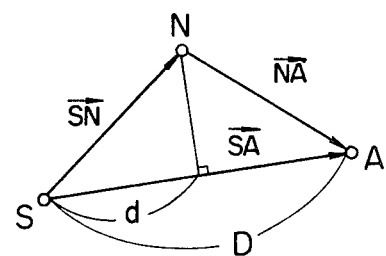
FIG. 7 is a vector diagram for explaining the operation in another embodiment of the present invention.

Also, as shown in FIG. 7, the vector diagram of the ratio between the component d of the distance from the starting point S to the present point N along the direction from the starting point S to the destination point A and the linear distance D from the starting point S to the destination point A, that is, $d/D \times 100$ (%) may be calculated at the operation section 4 and displayed on the distance indicator section 62. In this case, the indication may take the form of a bar or a circle instead of a numeral.

In the embodiments described above, the vector value $\vec{NA}$ representing the distance from the present position N to the destination A is calculated at the operation section 4 and a display signal is generated each time of distance coverage of 100 m. In place of this method, a timer may be used in such a manner that the vector value $\vec{NA}$ is calculated and a display signal is generated at predetermined intervals of time. As still another alternative method, the vector value $\vec{NA}$ may be calculated all the time and a corresponding display signal may be generated at predetermined intervals of distance or time.

Further, the angle indicator section 61 in the position indicator section 6 may be constructed with eight light-emitting elements around the digital display of the distance indicator section 62 so that the driver may understand the direction visually with ease.

Also, the signal generator means may be such that a signal from outside the motor vehicle indicating the driving direction thereof is detected thereby to generate a display signal.

We claim:
1. A motor vehicle guidance system, comprising:
    direction detector means for generating a current direction signal corresponding to a current driving direction of the motor vehicle;
    means for generating a signal indicative of actual distance traveled by the motor vehicle;
    destination setting means for generating set signals corresponding to the direction and distance from a starting point to a destination point, said set signals being set at the starting point;
    computer means for processing the current direction signal from said direction detector means, the actual distance traveled signal and the set signals from said destination setting means for producing data representing the direction from a present point of the vehicle to the destination point defined by said set signals and generating a present point to destination (PPD) vector signal representing said data; and
    display means including a first display section for indicating the current driving direction of the motor vehicle as defined by said current direction signal and a second display section for indicating the direction and distance from the present point to the destination point in accordance with the PPD signal from said computer means, said display means being adpated to indicate the data of said first and second display sections on the same display panel.

2. A motor vehicle guidance system, comprising:
    a distance sensor for generating a pulse signal in synchronism with the revolutions of a wheel of the motor vehicle;
    a distance detector section for generating in response to said pulse signal a unit distance traveled signal indicative of the motor vehicle having traveled a unit distance;
    a direction sensor mounted on the motor vehicle for producing a horizontal magnetic component signal proportional to a change in the intensity of a horizontal component of the earth magnetism as a function of changing driving direction of the motor vehicle;
    a direction detector section for generating in response to said horizontal magnetic component signal a direction signal indicative of the present driving direction of the motor vehicle;
    destination setting means, including direction setting means for setting a direction and distance setting means for setting a distance, for manually setting a direction and distance from a starting point to a destination point and generating set signals representing the direction from the starting point to the destination point and the linear distance from the starting point to the destination point;
    computer means for processing said set signals, said unit distance traveled signal and said direction signal and calculating a vector representing the direction and the distance from a present position to the destination point and producing a vector signal indicative of the direction and the distance of the vector thus calculated, and
    display means including a first display section for indicating the present driving direction of the motor vehicle as defined by said direction signal and a second display section for indicating data indicative of the direction from the present position to the destination point and the linear distance from the present position to the destination point in accordance with the vector signal, said display means being adapted to indicate the data of said first and second display sections on the same display panel.

3. A system according to claim 1 or 2, wherein said computer means (a) includes a timer and (b) calculates a vector from the starting point to the present position at predetermined intervals of time, said computer means calculating the vector from the present position to the destination point on the basis of said vector from the starting point to the present position and a vector from the starting point to the destination point defined by said set signals, said computer means producing signals respectively representing the direction and distance of said vector from the present position to the destination point.

4. A system according to claim 1 or 2, wherein said first display section includes at least eight arrow indicator sections radially arranged about a center thereof, one of said arrow indicator sections being caused to emit light thereby to indicate the current driving direction of the vehicle.

5. A system according to claim 2, wherein said second display section is adapted to indicate digital values of the angle of the direction and the linear distance from the present position to the destination point, respectively.

6. A system according to claim 2, wherein said computer means operates to produce data indicative of the linear distance and the direction from the starting point to the present position and produces a signal representing said data, for displaying said data on said second display section.

7. A system according to claim 2 wherein said computer means provides said vector signal each time a predetermined distance is traveled by said vehicle.

8. A system according to claim 1 or 2, wherein said computer means comprises a microcomputer.

9. An automotive vehicle guidance system, comprising:

a distance detection means for (a) detecting an actual traveling distance of a motor vehicle from a starting point to a present position, and (b) generating a distance coverage signal indicative of said actual traveling distance, a direction detector means for generating a direction signal corresponding to the driving direction of the motor vehicle, destination setting means, including manually settable direction setting means for setting a direction and distance setting means for setting a distance for producing set signals representing the direction from the starting point to a destination point and the linear distance from the starting point to the destination point;

computer means for (a) processing said set signals, distance coverage signal and direction signal and (b) calculating a vector including the direction and the distance from the present position to the destination point and producing a vector signal indicative of the direction and the distance respectively of the vector thus calculated, each time a predetermined distance is covered; and display means including a first display section for indicating the present driving direction of the motor vehicle in accordance with the direction signal and a second display section for indicating the direction from the present position to the destination point and the linear distance from the present position to the destination point in accordance with the vector signal from said computer means, said display means being adapted to indicate the data of said first and second display sections on the same display panel.

* * * * *